(12) United States Patent
Ulbrich et al.

(10) Patent No.: US 6,354,622 B1
(45) Date of Patent: Mar. 12, 2002

(54) STEERING WHEEL WITH AN AIRBAG MODULE

(75) Inventors: Christian Ulbrich, München; Andreas Laue, Elsenfeld, both of (DE)

(73) Assignee: Petri AG, Aschaffenburg (DE)

( * ) Notice: Subject to any disclaimer, the term of this patent is extended or adjusted under 35 U.S.C. 154(b) by 0 days.

(21) Appl. No.: 09/462,788

(22) PCT Filed: Jul. 14, 1998

(86) PCT No.: PCT/DE98/01897

§ 371 Date: Jan. 12, 2000

§ 102(e) Date: Jan. 12, 2000

(87) PCT Pub. No.: WO99/03710

PCT Pub. Date: Jan. 28, 1999

(30) Foreign Application Priority Data

Jul. 16, 1997 (DE) .......................................... 197 31 314

(51) Int. Cl.[7] .............................................. B60R 21/20
(52) U.S. Cl. ................. 280/731; 280/728.2; 280/728.3; 74/552
(58) Field of Search .......................... 280/728.2, 728.3, 280/731; 74/552; 200/61.55, 61.54

(56) References Cited

U.S. PATENT DOCUMENTS

| 5,024,464 A | 6/1991 | Kawaguchi et al. ........ 280/731 |
| 5,228,362 A | * 7/1993 | Chen et al. .................. 74/552 |
| 5,235,146 A | 8/1993 | Suzuki .................... 200/61.54 |
| 5,303,952 A | * 4/1994 | Shermetaro et al. ........ 280/731 |
| 5,410,114 A | * 4/1995 | Furuie ...................... 200/61.55 |
| 5,431,438 A | 7/1995 | Manabe ..................... 280/731 |
| 5,508,482 A | * 4/1996 | Martin et al. ............. 200/61.55 |
| 5,685,557 A | 11/1997 | Persson et al. .......... 280/728.2 |

FOREIGN PATENT DOCUMENTS

| DE | 37 10 173 | 10/1988 |
| DE | 39 25 761 | 2/1990 |
| DE | 195 21 937 | 12/1995 |
| DE | 44 39 576 | 5/1996 |
| DE | 196 53 684 A1 | * 6/1998 |
| EP | 0 560 355 | 9/1993 |
| EP | 0 572 125 A1 | * 12/1993 |
| EP | 0 573 145 A1 | * 12/1993 |
| EP | 0 586 055 | 3/1994 |
| EP | 0 710 590 | 5/1996 |
| GB | 2 270 657 | 3/1994 |
| JP | 404143143 A | * 5/1992 |
| JP | 041 66458 | 6/1992 |
| JP | 406270817 A | * 9/1994 |
| JP | 409058393 A | * 3/1997 |

* cited by examiner

Primary Examiner—Lanna Mai
Assistant Examiner—Ruth Ilan
(74) Attorney, Agent, or Firm—Foley & Lardner

(57) ABSTRACT

A steering wheel has an airbag module and a separate cap covering the airbag module. The airbag module is connected to a skeleton or hub of the steering wheel using a plurality of vibration damping elements to isolate the airbag module from the hub. The cap, on the other hand has no vibration damping element. As the cap is directly linked to the hub, it oscillates with the hub and the components attached thereto so that no relative movement therebetween exists.

15 Claims, 5 Drawing Sheets

STEERING WHEEL WITH AN AIRBAG MODULE

FIELD OF THE INVENTION

The invention relates to a steering wheel with airbag module.

BACKGROUND OF THE INVENTION

There is a problem with motor vehicle steering wheels owing to the rigid coupling with the steering column. Namely, that vibrations occur on the steering wheel at least in certain speed ranges. These vibrations are caused by the inherent frequency of the airbag/steering wheel depending on a certain engine speed. In order to reduce the vibrations, it is known to displace the inherent frequency of the airbag/ steering wheel by applying an additional mass on the steering wheel in a frequency range which lies outside of the area of the vibrations actually occurring on the steering wheel. It is also known, for example, from DE 37 10 173 A1 to mount the housing of the airbag unit floating on the steering wheel but damped so that the airbag unit can move relative to the steering wheel across the longitudinal axis of the steering column.

It is additionally proposed that the housing can also move in the direction of the longitudinal axis of the steering column. The mobility is achieved by fixing retaining yokes on the sides of the housing wherein these yokes have in corresponding bores bearing bushes which have noise-damping properties. Retaining screws are guided through the bearing bushes for fixing the retaining yokes on the spokes of the steering wheel. A clearance is thereby provided between the shaft of each retaining screw and the relevant bush to allow lateral displacement of the retaining yokes relative to the retaining screws. Thus, a floating bearing is achieved. The entire airbag module, including the cap which screens the airbag from the passenger cell, is thereby mounted with a floating action.

The drawback with this arrangement is that when vibrations appear on the steering wheel, these vibrations are visible, inter alia, through the relative movement of the cap relative to the steering wheel. As the steering wheel vibrates as a result of the rigid coupling with the steering spindle, no or markedly reduced vibrations appear on the cap. Therefore, a relatively large gap has to be provided between the cap and the steering wheel in order to avoid the mutual friction and thus troublesome noises which occur when vibrations arise.

SUMMARY OF THE INVENTION

One object of the invention is therefore, in the case of a steering wheel, to eliminate at least substantially, a relative movement between the steering wheel and a cap which is mounted separately opposite the upper side of the steering wheel for the purpose of covering the airbag module from the passenger cell.

In the case of a steering wheel having an airbag module, which is covered from the passenger cell by a cap running separately from the steering wheel on the upper side thereof, according to the invention, the airbag module and the cap are fixed separately from each other on the steering wheel in the area of the airbag module. The airbag module is connected to the steering wheel by at least one of a vibration damping or elastic element.

With this arrangement, according to the invention, the airbag module is vibrationally disengaged from the steering wheel when using a vibration damping element while the cap is connected to the steering wheel, without vibrational disconnection. In the event of vibration of the steering wheel, the cap running separately from the steering wheel on the upper side thereof oscillates together with the steering wheel, so that no relative movement takes place between the two. It is thereby possible to keep the gap between the steering wheel and cap small. Fitting an additional mass on the steering wheel to shift the inherent frequency is not necessary.

When using at least one vibration damping element through a phase displacement of the vibration of the airbag module, the inherent frequency of the overall system is shifted into areas in the motor vehicle that are not critical. This is reached, in particular, by matching the damping value of the vibration damping element to the mass of the vibrating module.

As subassemblies of the airbag module, a gas generator, a gas bag retaining plate, a gas bag and a folding chamber restriction plate with cover, are fixed on at least one support plate that is connected to the steering wheel by the vibration damping or elastic element.

It is expedient to provide a connecting plate between the steering wheel and the vibration damping or elastic element.

Each vibration damping element is preferably formed like a bushing and is mounted on a screw with a nut, wherein between the vibrating damping element and the screw head or nut a generator support plate is fixed as a connecting plate that is connected to the steering wheel skeleton and on which the cap is fixed.

In a further embodiment, each connecting plate is bent to a round hook shape at its upper end. The cap has an edge projecting into the steering wheel. The cap edge has apertures in which the upper ends of the connecting plates are locked.

Each connecting plate can be connected directly to the steering wheel skeleton. In a further development it is proposed that each connecting plate is fixed on a contact bridge that in turn is connected to the steering wheel skeleton. In this embodiment the cap is then likewise connected by the connecting plates to the contact bridge so that by pressing down the cap in a known way contacts are brought into connection with each other to operate the horn.

When using elastic elements, there are preferably three elastic elements arranged at the same angular spacing that extend between at least one support plate as a generator support and at least one connecting plate as a generator retaining plate.

In a further embodiment, a ring-shaped elastic element is mounted between the steering wheel hub formed as the generator support, and the airbag module.

The property of the elastic element is thus matched to the mass of the vibrating airbag module so that through a phase displacement of the vibration of the airbag module the inherent frequency of the overall system is moved into non-critical areas. The elastic elements are preferably made of elastomer.

DESCRIPTION OF THE DRAWINGS

The invention will now be explained with reference to the embodiments shown in the drawings in which.

DETAILED DESCRIPTION

Figure 1:
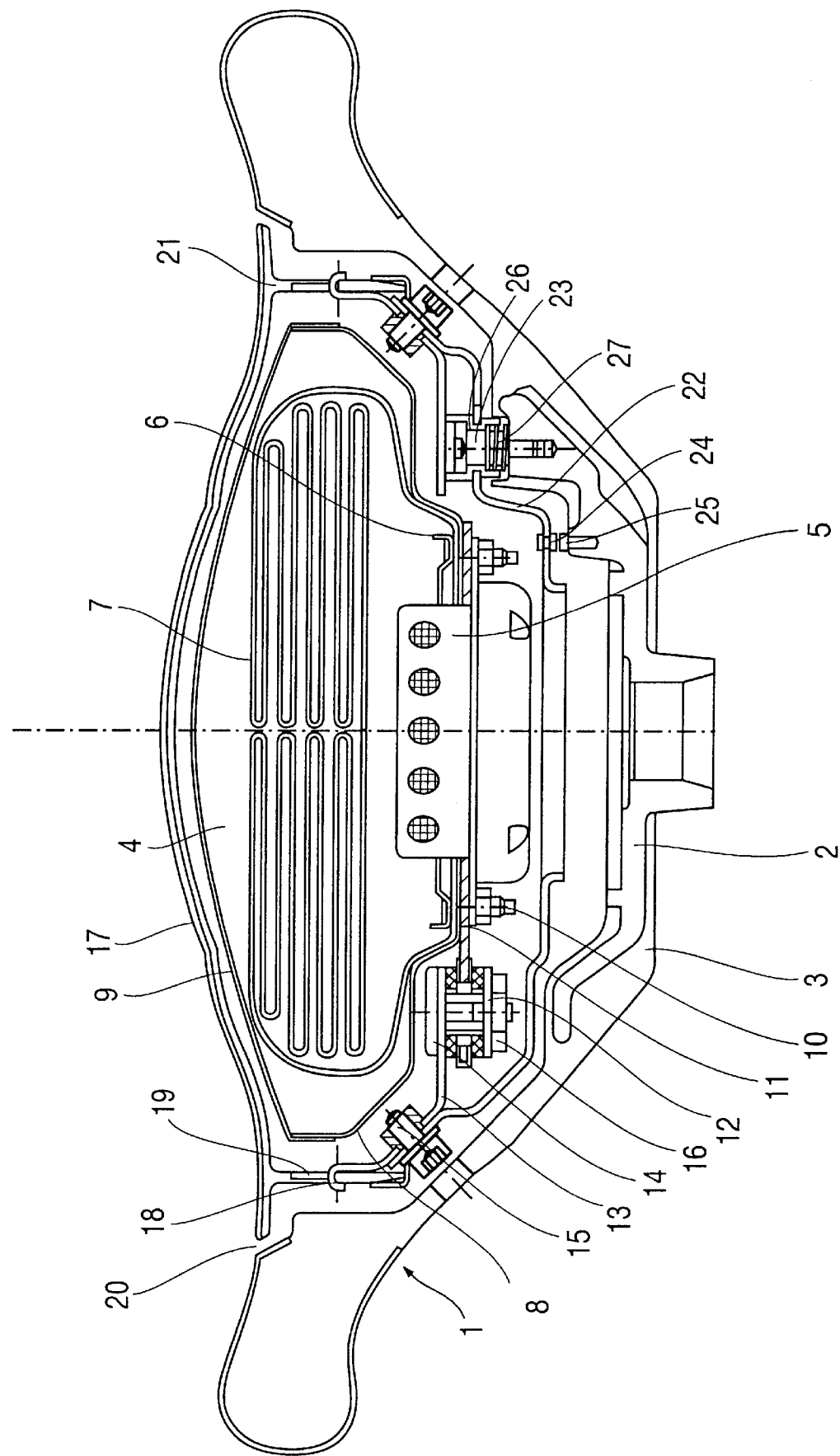
FIG. 1 is a sectional view through a steering wheel with an airbag module, which is mounted displaceable on a plurality of vibration damping elements for operating the horn.

As shown in FIG. 1, a steering wheel 1 has a steering wheel skeleton or hub 2, which is covered with PUR foam 3. Inside the steering wheel 1 is an airbag module 4. The airbag module 4 has a gas generator 5, a gasbag retaining plate 6, a gasbag 7, as well as a folding chamber restricting plate 8 with a cover 9. These structural elements of the airbag module 4 are fixed by screws 10 on a support plate 11, which is mounted in several bushing configured vibration damping elements 12 as disengagement elements. These are connected by connecting plates 13 by means of screws 15 to a contact bridge 22, which in turn is connected by screws 23 to the steering wheel skeleton 2. The vibration damping elements 12 are fixed on the connecting plates 13 by means of screws 14 and nuts 16.

Because of the vibrating damping elements 12, vibrations of the steering wheel 1 are only transferred to the airbag module 4 to a slight extent or not at all.

A cap 17, which covers the airbag module from the passenger cell, is connected by the connecting plates 13 to the steering wheel skeleton 2. The connection between the cap 17 and the connecting plates 13 takes place in such a way that the connecting plates 13 are bent round hook shaped at their upper end 18 and are locked by this end in apertures 19 of the cap 17. The cap thus stands in connection with the steering wheel skeleton 2 without the vibration damping elements, and when vibrations appear, it oscillates in the same way as the steering wheel. Thus, there is hardly any relative movement between the cap 17 and the surface of the steering wheel so that a slit 20 between the cap 17 and the steering wheel 1 can be small, thus improving the appearance of the steering wheel.

The bearing according to the present invention can be applied both to an airbag module fixedly connected to a steering wheel and also to an airbag module that is mounted displaceable relative to the steering wheel skeleton for operating the horn (floating horn), as shown in FIG. 1. In FIG. 1, the contact bridge 22 with an electric contact 24 is displaceable in the direction of the steering wheel skeleton 2 which has an electric counter contact 25. Displacement of the contact bridge 22 is possible because the contact bridge has in the area of the screws 23, bushes 26 that are displaceable on the screws 23 against the pressure of a spring 27. When pressure is applied on the cap 17 the contact bridge 22 is displaced together with the airbag module 4 until the contact 24 and the counter contact 25 touch one another and the horn is activated.

Figure 2:
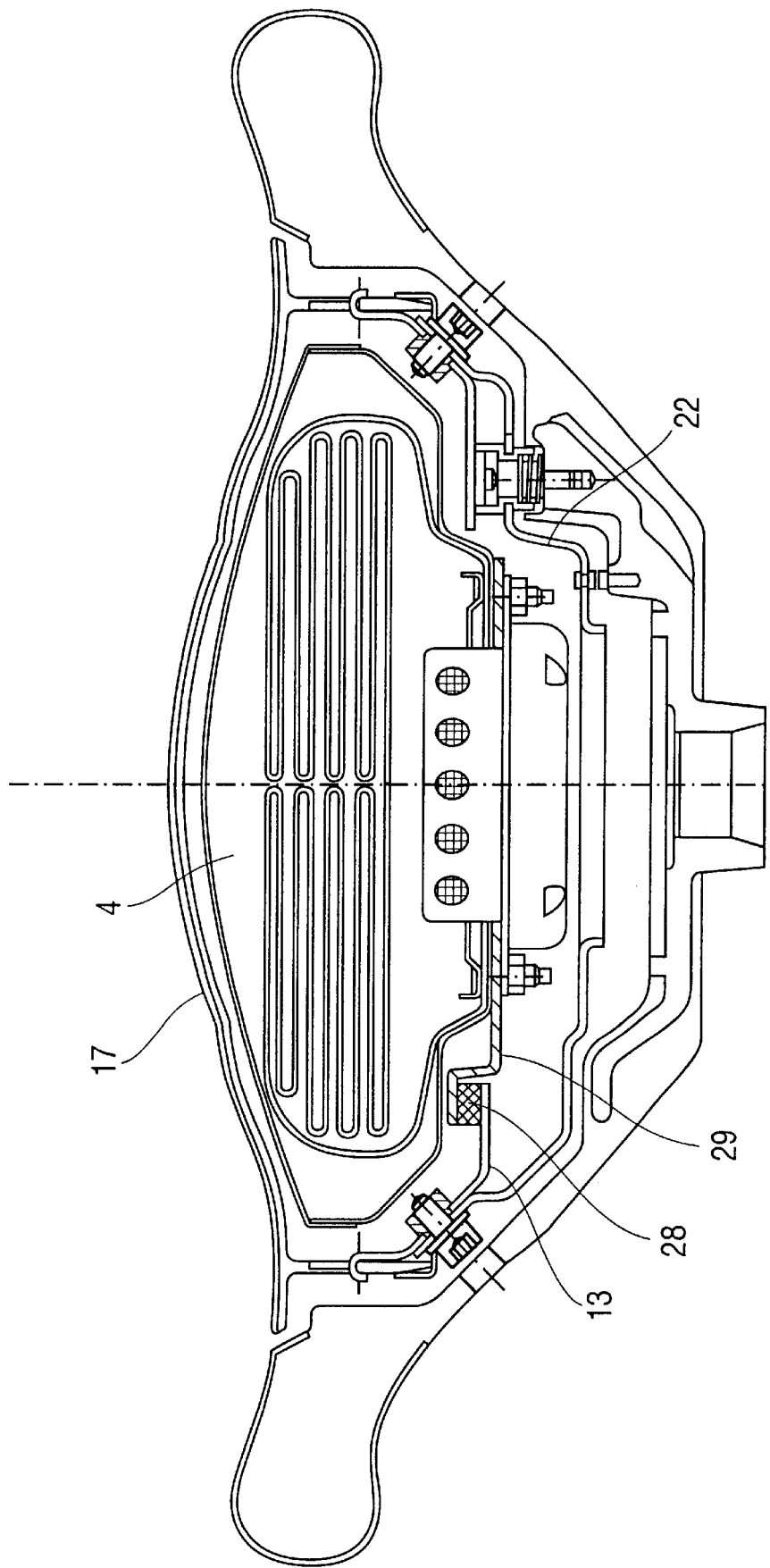
FIG. 2 is a sectional view through a steering wheel with an airbag module which is mounted displaceable on an elastic element and for operating the horn.

With the embodiment of FIG. 2, three elastic elements 28 are mounted as coupling elements on the connecting plates 13, with only one element being shown in FIG. 2. Support plates 29 rest on these elastic elements. The connection of the elastic elements with the connecting plates and support plates is, for example, through screws or adhesive. The elastic elements consist of rubber and are matched in their hardness to the mass of the oscillating airbag module 4, thus, through a phase displacement of the oscillation of the airbag module 4 the inherent frequency of the overall system, which consists in part of the airbag module 4, the contact bridge 22, the connecting plates 13 and the cap 17, is displaced into areas which are non-critical in the motor vehicle.

Figure 3:
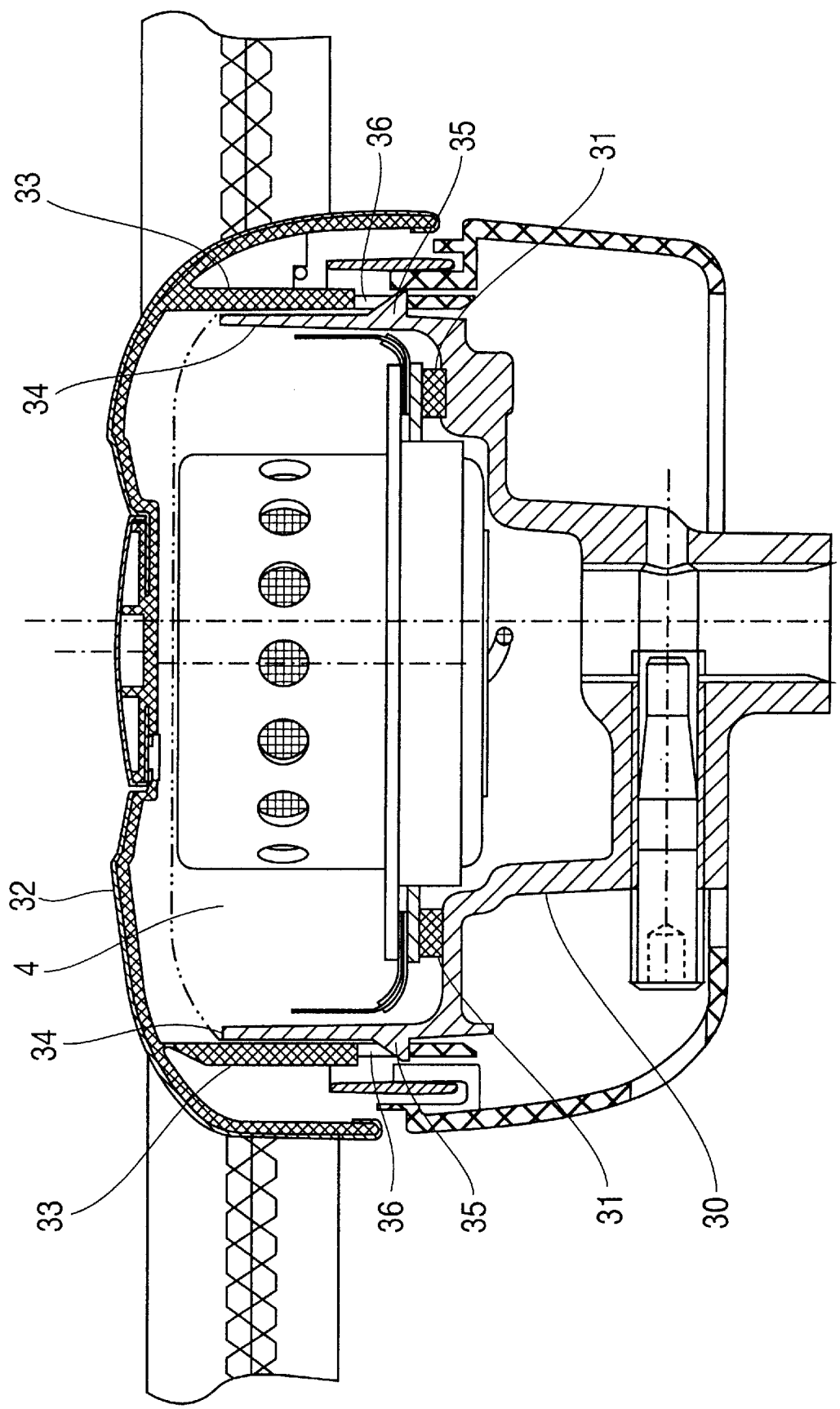
FIG. 3 is a sectional view through a steering wheel with an airbag module mounted over a ring-shaped elastic element.
Figure 4:
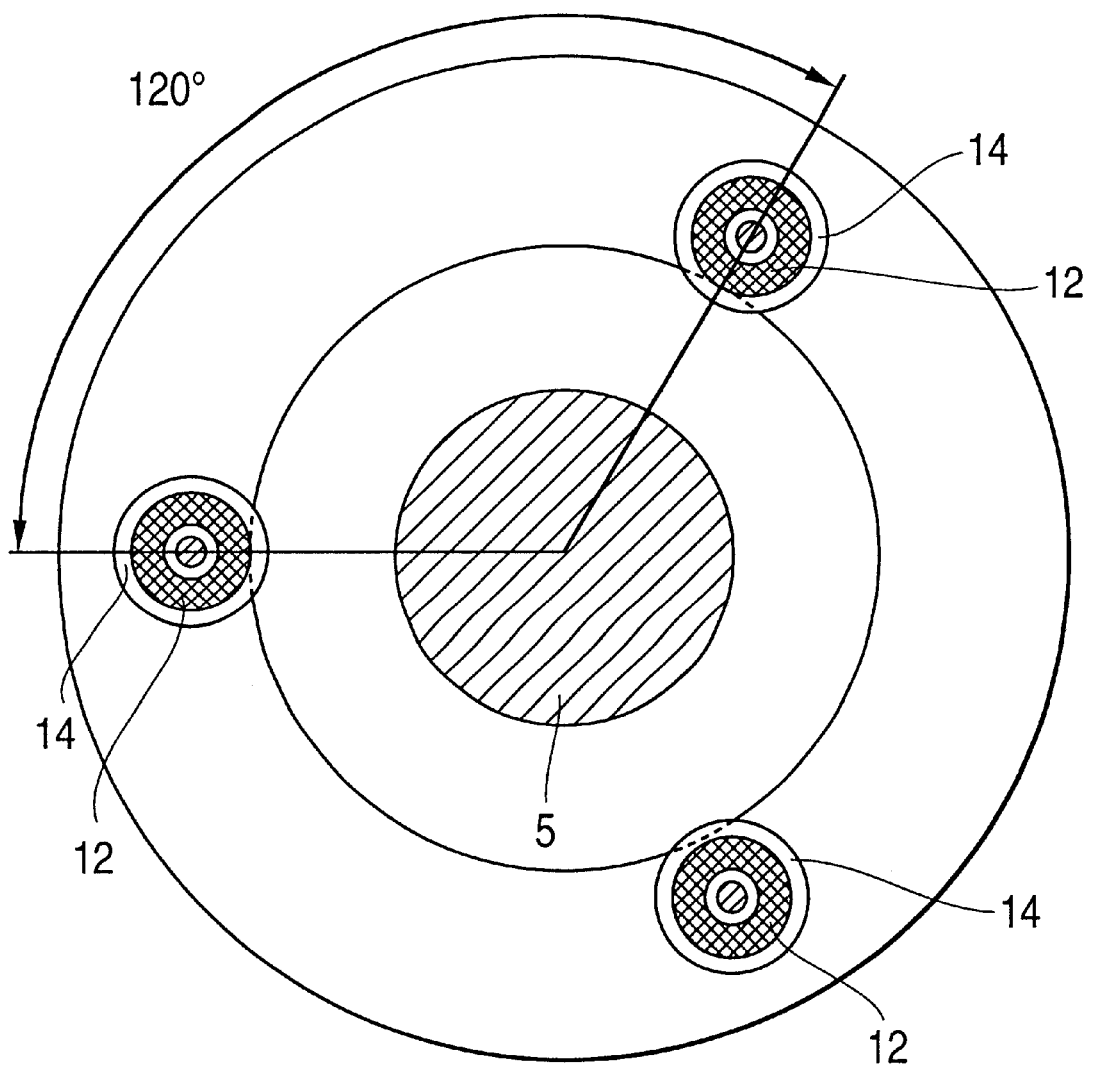
FIG. 4 is a schematic top view of FIG. 1, illustrating three equally spaced ring-shaped elastic elements.
Figure 5:
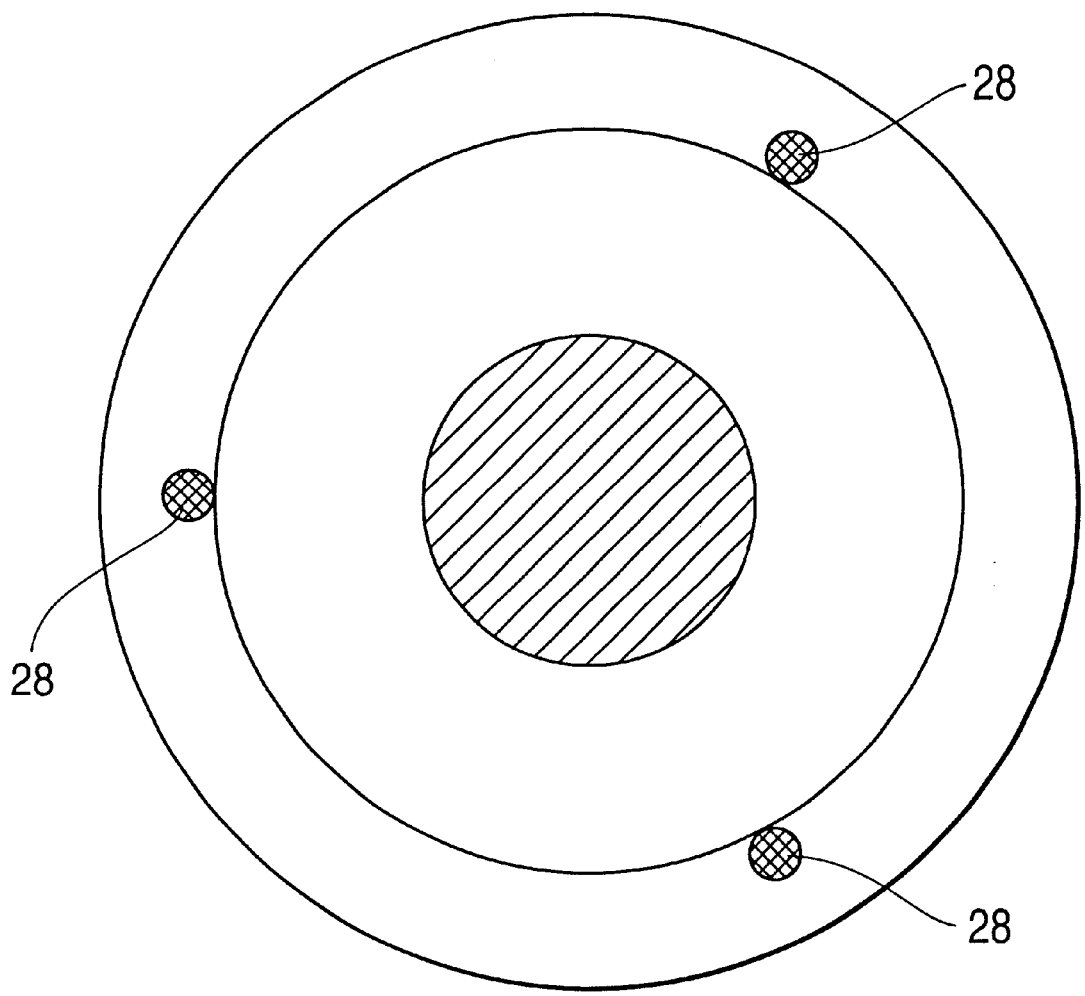
FIG. 5 is a schematic top view of FIG. 2, illustrating three equally spaced vibrating damping elements.

In the embodiment of FIG. 3, the steering wheel skeleton or hub is formed as a generator support 30. The airbag module 4 is fixed on the same with the interposition of a single ring-shaped elastic element 31. The cap 32 has webs 33 and a circumferential edge, which serves to fix the cap on the steering wheel. To this end, webs 34 are provided on the generator support corresponding to the webs 33 of the cap. The generator support webs 34 have bulges 35, which engage in slits 36 in the webs 33 of the cap. When fitting the cap onto the generator support, the webs 33 of the cap are elastically deformed so that they can be pushed over the bulges 35. When the bulges engage in the slits 36 the webs 33 of the cap spring back and the cap is connected to the generator support 30. bulges engage in the slits 36 the webs 33 of the cap spring back and the cap is connected to the generator support 30.

With this arrangement, because of the elastic elements 31, the additional mass provided on the steering wheel hub of known steering wheels for influencing the oscillating behaviour can now be omitted.

What is claimed is:

1. A steering wheel assembly comprising:
    a steering wheel having an upper side and a contact bridge;
    an airbag module;
    a cap covering the airbag module from the upper side of the steering wheel; and
    at least one vibration damping element;
    wherein the cap is separate from the steering wheel and not connected on the upper side thereof;
    wherein the airbag module and the cap are mounted on the contact bridge of the steering wheel; and
    wherein only the airbag module is connected to the contact bridge of the steering wheel through the at least one vibration damping element.

2. A steering wheel assembly according to claim 1, wherein the airbag module includes a gas generator, a gasbag retaining plate, a gasbag, and a folding chamber restricting plate, and a gasbag cover.

3. A steering wheel assembly according to claim 1 or 2, further comprising a connecting plate between the steering wheel and the vibration damping element.

4. A steering wheel assembly according to claim 1, wherein the airbag module is connected to the steering wheel with a plurality of vibration damping elements, each of which is ring-shaped.

5. A steering wheel assembly according to claim 4, wherein the steering wheel has a hub and at least one connecting plate secured to the hub, the connecting plate has a hook-shaped upper end, the cap has a projection projecting toward the hub, and projection has an aperture through which the hook-shaped upper end extends.

6. A steering wheel assembly according to claim 5, wherein the contact bridge secures the connecting plate to the hub.

7. A steering wheel assembly according to claim 5, further including at least one support plate secured to the airbag module, wherein three equally spaced vibration damping elements are arranged between the support plate and the connecting plate.

8. A steering wheel assembly according to claim 1, wherein the damping value of the vibration damping element is selected based on the mass of the vibrating airbag module.

9. A steering wheel assembly according to claim 1, wherein the vibration damping element comprises an elastomer.

10. A steering wheel assembly according to claim 7, wherein the support plate has three openings seating the vibrating damping elements.

11. A steering wheel assembly according to claim 1, wherein the steering wheel has a steering wheel hub and the airbag module is suspendedly mounted to the hub via the vibration damping element to isolate the airbag assembly from the hub.

12. A steering wheel assembly according to claim 11, wherein the steering wheel has at least one support plate secured to the airbag module and at least one connecting plate secured to the hub, wherein the support plate is secured to the connecting plate via a plurality of vibrating damping elements.

13. A steering wheel assembly according to claim 12, wherein the cap is secured to the connection plate.

14. A steering wheel assembly comprising:

a steering wheel having an upper side and a hub;

an airbag module;

a cap covering the airbag module from the upper side of the steering wheel; and at least one vibration damping element;

wherein the cap is separate from the steering wheel and not connected on the upper side thereof;

wherein the hub has a plurality of upright webs;

wherein the airbag module is mounted on the hub and the cap is mounted on the webs; and wherein only the airbag module is connected to the hub through the vibration damping element.

15. A steering wheel assembly according to claim 14, wherein the vibration damping element is ring-shaped and positioned between the airbag module and the hub.

* * * * *

UNITED STATES PATENT AND TRADEMARK OFFICE
CERTIFICATE OF CORRECTION

PATENT NO.    : 6,354,622 B1
DATED         : March 12, 2002
INVENTOR(S)   : Christian Ulbrich et al.

It is certified that error appears in the above-identified patent and that said Letters Patent is hereby corrected as shown below:

<u>Title page,</u>
Item [73], Assignee, should read as follows:

-- [73]  Assignee   Takata-Petri AG    Aschaffenburg (DE) --

Signed and Sealed this

Tenth Day of September, 2002

Attest:

JAMES E. ROGAN
*Attesting Officer*          *Director of the United States Patent and Trademark Office*